United States Patent
Gatto

(10) Patent No.: US 10,027,167 B2
(45) Date of Patent: Jul. 17, 2018

(54) LOAD CONTROL SYSTEM

(71) Applicant: Embertec Pty Ltd, Dulwich (AU)

(72) Inventor: Ricardo Gatto, Dulwich (AU)

(73) Assignee: Embertec Pty Ltd (AU)

( * ) Notice: Subject to any disclaimer, the term of this patent is extended or adjusted under 35 U.S.C. 154(b) by 571 days.

(21) Appl. No.: 14/635,365

(22) Filed: Mar. 2, 2015

(65) Prior Publication Data

US 2015/0256032 A1    Sep. 10, 2015

(30) Foreign Application Priority Data

Mar. 5, 2014  (AU) ................................ 2014900742

(51) Int. Cl.
*H02J 13/00*  (2006.01)
*H02J 3/14*  (2006.01)

(52) U.S. Cl.
CPC .......... *H02J 13/0017* (2013.01); *H02J 3/14* (2013.01); *H02J 2003/146* (2013.01); *Y02B 70/3225* (2013.01); *Y02B 70/3275* (2013.01); *Y02B 90/2607* (2013.01); *Y04S 20/222* (2013.01); *Y04S 20/224* (2013.01); *Y04S 20/244* (2013.01); *Y04S 40/12* (2013.01); *Y10T 307/438* (2015.04)

(58) Field of Classification Search
CPC ..... H02J 13/0017; H02J 3/14; Y01T 307/438; Y02B 70/3275; Y04S 20/222; Y04S 20/224
USPC ................................ 307/33–35, 38
See application file for complete search history.

(56) References Cited

U.S. PATENT DOCUMENTS

| | | | | |
|---|---|---|---|---|
| 4,106,097 A | * | 8/1978 | Fox ........................... | H02J 3/14 307/52 |
| 4,181,950 A | * | 1/1980 | Carter, II ........... | G01R 21/1333 307/35 |
| 4,901,007 A | | 2/1990 | Sworm | |
| 5,721,934 A | | 2/1998 | Scheurich | |
| 6,092,209 A | | 7/2000 | Holzhammer et al. | |
| 6,476,729 B1 | | 11/2002 | Liu | |
| 6,510,369 B1 | * | 1/2003 | Lacy ........................ | H02J 3/14 700/295 |

(Continued)

FOREIGN PATENT DOCUMENTS

| | | |
|---|---|---|
| AU | 2011 101402 A4 | 12/2011 |
| AU | 2012 100197 A4 | 3/2012 |

(Continued)

*Primary Examiner* — Dinh T Le
(74) *Attorney, Agent, or Firm* — Craig A. Fieschko, Esq.; DeWitt Ross & Stevens S.C.

(57) ABSTRACT

An energy management system controls electrical load operation to maintain the loads' energy usage below a maximum energy limit. An OFF priority list specifies enabled loads that can be disabled, with an enabled load having higher priority if further from the load's action threshold (such as a desired operating temperature). An ON priority list specifies disabled loads that can be enabled, with a disabled load having higher priority if closer to the load's action threshold. If the collective loads' energy consumption is below a control energy level set below the maximum energy limit (preferably by an amount approximating the projected consumption of the largest disabled load), the load atop the ON priority list is enabled and moved to the OFF priority list. If the collective loads' energy consumption is above the control energy level, the load atop the OFF priority list is disabled and moved to the ON priority list.

32 Claims, 5 Drawing Sheets

(56) References Cited

U.S. PATENT DOCUMENTS

| | | | |
|---|---|---|---|
| 6,528,957 B1* | 3/2003 | Luchaco | H05B 37/034 307/31 |
| 7,204,093 B2* | 4/2007 | Kwon | F24F 11/006 236/1 B |
| 7,380,142 B2 | 5/2008 | Lee et al. | |
| 8,190,940 B2 | 5/2012 | Gelonese | |
| 8,362,918 B2 | 1/2013 | Choi et al. | |
| 8,386,369 B2 | 2/2013 | Warnick | |
| D700,579 S | 3/2014 | Gelonese | |
| 9,048,688 B2* | 6/2015 | Spitaels | H02J 3/14 |
| 2005/0030680 A1 | 2/2005 | Lee et al. | |
| 2005/0289378 A1 | 12/2005 | Vorenkamp et al. | |
| 2006/0101294 A1 | 5/2006 | Lee et al. | |
| 2008/0106148 A1 | 5/2008 | Gelonese | |
| 2009/0235107 A1 | 9/2009 | Gelonese | |
| 2010/0019574 A1* | 1/2010 | Baldassarre | H02J 3/14 307/23 |
| 2010/0095146 A1 | 4/2010 | Gelonese | |
| 2010/0156666 A1 | 6/2010 | Choi et al. | |
| 2011/0106687 A1 | 5/2011 | Warnick | |
| 2011/0254371 A1 | 10/2011 | Galsim et al. | |
| 2012/0080949 A1 | 4/2012 | Gelonese | |
| 2012/0312989 A1 | 12/2012 | Gelonese | |
| 2014/0292289 A1 | 10/2014 | Gelonese | |
| 2014/0310744 A1 | 10/2014 | Gelonese | |
| 2015/0039429 A1 | 2/2015 | Gelonese | |

FOREIGN PATENT DOCUMENTS

| | | |
|---|---|---|
| AU | 2012 101351 A4 | 9/2012 |
| CA | 2585966 A1 | 5/2006 |
| CA | 2743270 A1 | 5/2010 |
| CA | 2719683 A1 | 5/2011 |
| CN | 1773399 A | 5/2006 |
| CN | 102292895 A | 12/2011 |
| CN | 102356363 A | 2/2012 |
| EP | 1612910 A1 | 1/2006 |
| EP | 2356525 A2 | 8/2011 |
| JP | 2003 271812 A | 9/2003 |
| JP | 2006 139745 | 6/2006 |
| JP | 2011 010436 A | 1/2011 |
| KR | 20100075283 A | 7/2010 |
| NO | 20072468 A | 5/2007 |
| TW | 201031072 A | 8/2010 |
| WO | WO 03062973 A1 | 7/2003 |
| WO | WO 2006 052047 | 5/2006 |
| WO | WO 2008 077198 A1 | 7/2008 |
| WO | WO 2010 057343 A2 | 5/2010 |
| WO | WO 2010 074392 A1 | 7/2010 |
| WO | WO 2010 139020 A1 | 12/2010 |
| WO | WO 2013 006916 A1 | 1/2013 |
| WO | WO 2013 056310 A1 | 4/2013 |
| WO | WO 2013 131147 A1 | 9/2013 |
| WO | WO 2014 094031 A1 | 6/2014 |

* cited by examiner

LOAD CONTROL SYSTEM

FIELD OF THE INVENTION

This invention relates to the field of control of energy use for switchable loads including, but not limited to, air-conditioning systems.

BACKGROUND OF THE INVENTION

A large part of the cost of supplying electrical energy to a premises is related to the peak demand for energy by that premises. Infrastructure sufficient to meet the peak demand must be provided, even though it will be underutilized at non-peak demand times, which will be the majority of the time.

Accordingly, many commercial, government and industrial electricity consumers are charged for electricity in a manner which seeks to compensate the energy supplier for this requirement. The consumer is charged in two parts; a usage charge per kWh of energy consumed, and a demand charge which is related to the maximum instantaneous wattage supplied to the premises in a given billing period. In some cases, the demand charge may be the greater part, or even the whole of the charge levied for a billing period.

SUMMARY OF THE INVENTION

In one form of this invention there is provided an energy management system adapted to control operation of one or more electrical loads wherein the operation is controlled such that the energy usage of the electrical loads remains below a Maximum Energy Limit.

Preferably, each of the electrical loads is a device which operates intermittently in order to keep the value of a load control parameter in a defined range where the defined range is defined as being either above or below an action threshold.

Preferably, each of the electrical loads is controlled such that the energy usage is permitted to exceed the Maximum Energy Limit if required in order to ensure that the value of the load control parameter remains within the defined range.

Preferably, each of the electrical loads is controlled such that the load control parameter is permitted to range outside the defined range if required in order to ensure that the Maximum Energy Limit is not exceeded.

Preferably, the devices are air conditioning devices and the load control parameter associated with each device is the temperature of the space in which that device is operating.

Preferably, the load control parameter is a comfort level calculated from the temperature and humidity of the space in which that device is operating.

Preferably. each of the electrical loads is a water heater and the load control parameter associated with each device is a water temperature.

Preferably, the action threshold is determined by the energy management system and an input into said determination is the actions of a user in manually controlling the operation of the electrical device.

Preferably, the action threshold is determined by the energy management system and an input into said determination is value of environmental parameters other than the load control parameter.

Preferably, the energy management system further includes a communications module adapted to receive communication of the Maximum Energy Limit from an energy supplier.

Preferably, there is a load controller adapted to be controlled by the energy management system, the load controller including a control module adapted to control one or more devices constituting the electrical loads.

Preferably the control module is an infra-red transmitter adapted to send command sequences to the air conditioner.

DETAILED DESCRIPTION OF PREFERRED VERSIONS OF THE INVENTION

Figure 1:
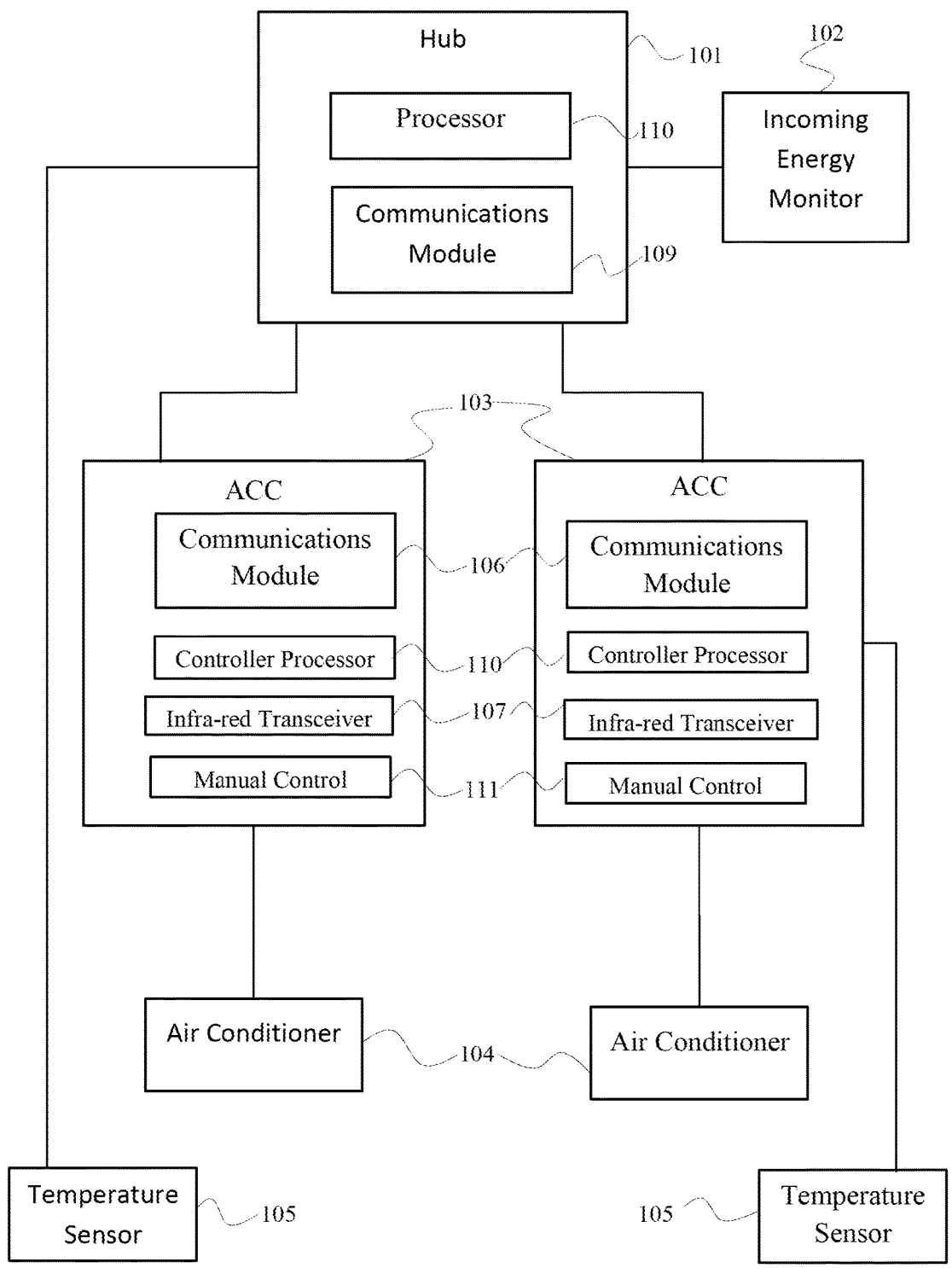
FIG. 1 shows a block diagram of a simple Energy Management System (EMS) incorporating the invention.

Referring now to the drawings, FIG. 1 illustrates a version of an Energy Management System (EMS) of the invention adapted for control of an air-conditioning load. A hub 101 includes a processor 110 and hub communication modules 109, which enable wired or wireless data communications with the hub 101. The hub 101 may be implemented in a general purpose computer, in a dedicated processing device (e.g., a microcontroller, application specific integrated circuit (ASIC), programmable logic device (PLD)), or another programmed or programmable device, and/or may be implemented in machine-readable instructions which may be used to create a general purpose computer, ASIC, PLD, or other device that operates as described.

The hub 101 is in data communication with Incoming Electricity Monitor (IEM) 102. The IEM 102 is adapted to provide data concerning the electricity supply incoming to a premises. This includes the instantaneous power (wattage) being supplied to the premises. The data may also include technical details of the power supply, such as voltage, current and power factor. The data may further include historical power usage for previous time periods.

Incoming Electricity Monitor (IEM) 102 may be implemented as a Smartmeter which is communication with the hub 101 by means of the Zigbee or other wireless communications protocol. In an alternative version, the IEM 102 may be implemented using one or more current clamp meters attached to the incoming electricity conductors, combined with a wireless transmission capability for communication with the hub 101. Voltage measurement means may also be included. Other measurement methods and communication protocols may be used.

The hub 101 controls one or more loads, here exemplified by air conditioning units 104. Control of the air conditioning units 104 is via one or more Air Conditioning Controllers (ACC) 103. The ACC 103 incorporates a controller communication module 106, a controller processor 110, and an infra-red transceiver 107. The controller communication module 106 is in data communication with the hub 101 via the hub communication module 109. This communication may be wired or wireless, and may use any convenient protocol including wi-fi.

The Air Conditioning Controller (ACC) 103 acts to control one or more air conditioners 104. The air conditioners may be of any type and preferably do not require specific adaptation in order to be controlled by the ACC 103.

Where a space is being air conditioned, conventionally the air conditioner has a setpoint temperature which is able to be set by a user. The air conditioner acts by cooling and/or heating to keep the temperature of the air conditioned space at the setpoint temperature. Generally the air conditioner achieves this by running until the setpoint temperature is reached and then turning off the compressor, or reducing the compressor power, until the temperature of the air conditioned space departs from the setpoint. A small amount of hysteresis about the set point may be provided in order to prevent the unit from constantly turning on and off The air conditioner turns on and off or otherwise controls the compressor without regard for any other loads which may be being supplied within the premises.

Generally, the small amount of hysteresis is far less than the variation in temperature which the occupants of the space would be prepared to tolerate. Thus, it is often possible to delay switching on the compressor of air conditioner, allowing the temperature to depart significantly from the setpoint, without causing the occupants any significant discomfort.

The Controller Processor 110 of the Air Conditioning Controller (ACC) 103 includes control capability suitable to control the particular air conditioner 104 which the ACC 103 controls. The air conditioner 104 might, for example, be a wall mounted split system unit with an infra-red remote control. In this version, the ACC 103 includes an IR transmitter or transceiver 107 capable of transmitting the infra-red command sequences which control the particular air conditioner 104. The IR transmitter or transceiver 107 is controlled by the Controller Processor 110. The ACC 103 may also include a manually controlled ON/OFF which allows a user to indicate that the air conditioner 104 is required to be in use. In other versions of the invention, the ACC 103 may include other control capabilities available to a user, including, without limitation, fan speed control, control of sweeping vanes and control of the air conditioner setpoint temperature.

A temperature sensor 105 is placed in the space to be cooled/heated by the air conditioner 104. The temperature sensor 105 provides temperature data about the space being cooled/heated to the hub 101. The temperature sensor 105 may be in direct wired or wireless communication with the hub 101. Alternatively the temperature sensor 105 may be monitored by the control processor 110, with the result communicated to the hub 101 by the Air Conditioning Controller (ACC) 103. Where the ACC 103 is placed within the space to be heated/cooled, the temperature sensor 105 may be provided as part of the ACC 103.

Figure 2:
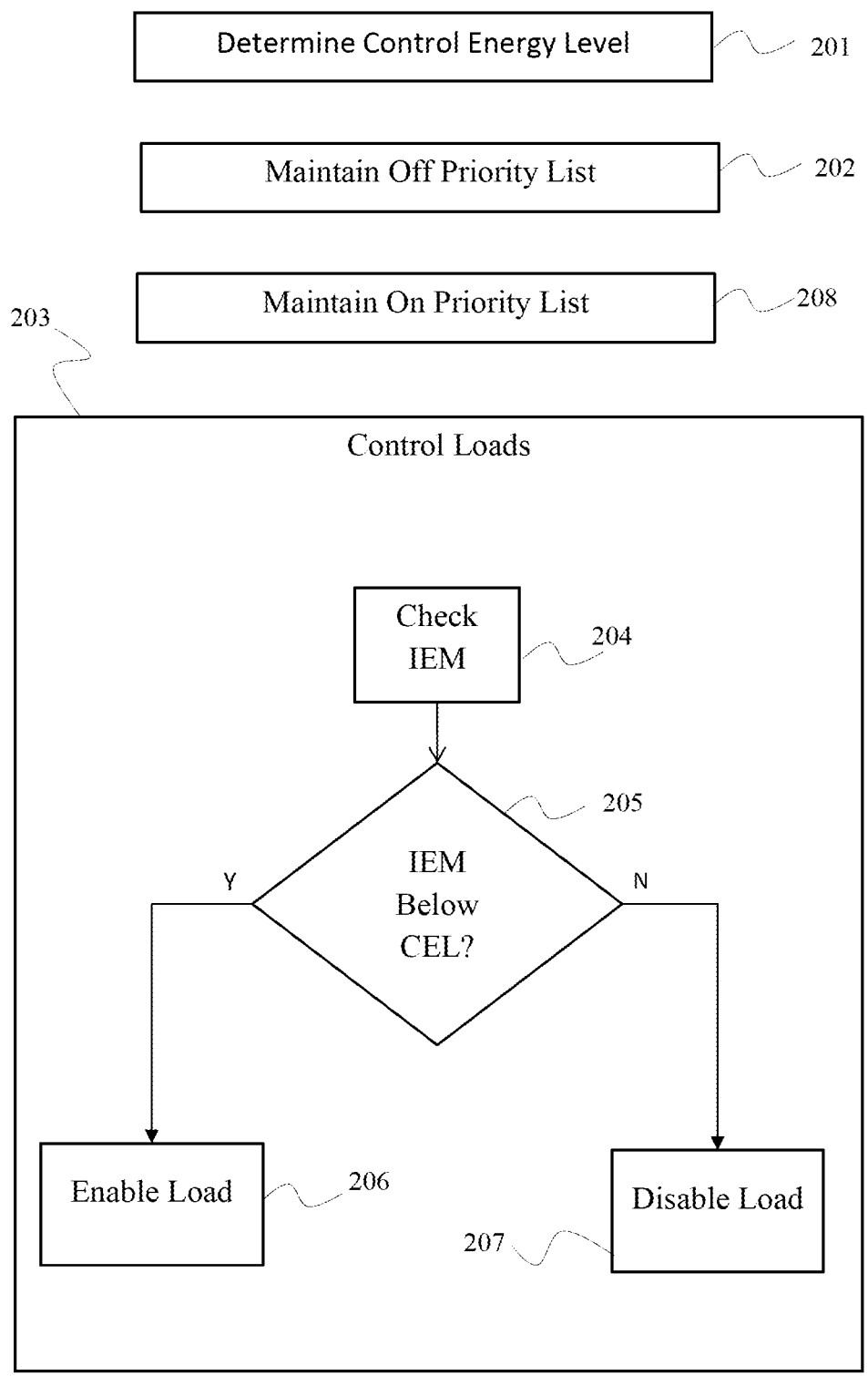
FIG. 2 shows a representation of the control modules of the EMS of FIG. 1.

The operation of the Energy Management System (EMS) of FIG. 1 is shown in FIG. 2. The EMS functions to keep the total energy use of a premises, or of a sub-region of a premises, below a defined Maximum Energy Limit (MEL) by controlling usage of air conditioners 104, without allowing undue user discomfort due to temperature extremes. The loads which contribute to the total energy use include the controlled air conditioners 104, and may include non-controlled loads which can include without limitation, air conditioners not controlled by the EMS; lighting; water heating; and plant machinery. Preferably, the MEL is user defined. In other versions of the invention, the MEL may be, at least in part, determined by the EMS.

The hub 101 processor runs process Determine Control Energy Level 201. The Control Energy Level (CEL) is the energy consumption level at which the EMS will begin to control loads. While the energy consumption is below the CEL, each air conditioner 104 runs independently in normal operating mode, using an installed thermostat in order to keep the temperature of the air conditioned space close to a setpoint. In FIG. 1, this will be an internal thermostat, with a setpoint communicated to the air conditioner via infra-red commands.

The Energy Management System (EMS) controlled air conditioners may be in one of three states: ENABLED and ON; ENABLED; and OFF or DISABLED. In this version, a unit with the status DISABLED is always OFF, having been turned off by the EMS. ENABLED means that the Manual Control is enabled, and a user may turn the air conditioner ON so that it will operate under the control of the local thermostat, or a user may turn the unit OFF. ON means that a user has switched the air conditioner on using the Manual Control, or alternatively the air conditioner has been turned on by the EMS or by another remote process. When ON the air conditioner operates under the control of the local thermostat. OFF means that the air conditioner has been switched off by a user using the Manual Control, or alternatively has been switched off by the EMS or another remote process. DISABLED means that the EMS has disabled the Manual Control.

The Energy Management System (EMS) begins to control the air conditioner loads when the energy consumption measured by the IEM 102 is such that the Maximum Energy Limit (MEL) is at risk of being exceeded, that is, at the Control Energy Level (CEL). This occurs when there is at least one air conditioner switched OFF which, if it were switched ON and began Operating, would add sufficient load to the currently measured incoming energy consumption that the MEL would be exceeded.

Accordingly, the Control Energy Level (CEL) is preferably the Maximum Energy Limit (MEL) less the start-up load of the largest capacity air conditioner load which is or may be currently idle (Largest Idle Load (LIL)). Air conditioners which are able to be started manually or by processes not under the control of the hub 101 processor are included as candidates to be LIL. Each controlled air conditioner, regardless of status, is also a candidate to be LIL. This is because the EMS does not know for any unit which is ENABLED and ON, whether it is operating at maximum capacity, or whether the local thermostatic control has switched off the compressor or switched the compressor to a lower power usage mode. Where there are other loads on the system which are not under the control of the EMS, the LIL may be a defined value provided to the Determine Control Energy Level process 201 by a user or an external process. Alternatively or additionally, the CEL may be decreased by a factor of safety to account for load fluctuations at a premises which are not under the control of the EMS. In any case, the CEL may be set by a user, or by the EMS, at any value below the MEL.

In parallel the hub 101 processor runs process Maintain OFF Priority List 202. The OFF Priority List is a list of the air conditioners or other loads under the control of the Energy Management System (EMS) placed in the order of priority in which the loads may be DISABLED by the EMS in order to keep the energy consumption below the Maximum Energy Limit (MEL).

For every area being air conditioned, an Action Threshold is defined. In the case where the area is being cooled, this is the maximum temperature which the area can be allowed to reach before air conditioning must be ENABLED by the Energy Management System (EMS). In the case where the area is being heated, this is the minimum temperature which the area can be allowed to reach before air conditioning must be ENABLED by the EMS. Preferably, the Action Threshold is the temperature at which user discomfort will occur.

The OFF Priority List is a dynamic list. In the simplest version, the position of an air conditioner on the OFF Priority List is determined by how closely the temperature of an area, as reported by temperature sensor 105, is approaching to an Action Threshold. The further the reported temperature is from the Action Threshold, the higher the corresponding air conditioner appears on the OFF Priority List. This means that the air conditioner most likely to be DISABLED is the one where users will take longest to notice as the temperature will take longer to become uncomfortable.

The difference between the current temperature reported by the temperature sensor 105 and the setpoint temperature for that air conditioned space may also be incorporated into calculation of the OFF Priority List. The closer the reported temperature is to the setpoint, the higher the corresponding air conditioner appears on the OFF Priority List.

In parallel the hub processor 110 runs process Maintain ON Priority List 208. The ON Priority List is a list of air conditioners which are available to be controlled by the Energy Management System (EMS) which are not ENABLED. Preferably, these will be units which have been DISABLED by the EMS to avoid breaching the Maximum Energy Limit (MEL) limit.

The ON Priority List is a dynamic list. In the simplest version, the position of an air conditioner on the ON Priority List is determined by how closely the temperature of an area, as reported by temperature sensor 105, is approaching to an Action Threshold. The closer the reported temperature is to the Action Threshold, the higher the corresponding air conditioner appears on the ON Priority List. This means that the air conditioner most likely to be ENABLED is the one where users are most likely to shortly become uncomfortable.

The difference between the current temperature reported by the temperature sensor 105 and the setpoint temperature for that air conditioned space may also be incorporated into calculation of the ON Priority List. The further the reported temperature is from the setpoint, the higher the corresponding air conditioner appears on the ON Priority List.

The hub processor 110 also runs the process Control Loads 203. This begins with the action Check Incoming Energy Monitor 204. This gives a result which is the instantaneous value of the energy consumption for the premises. This value is then compared (at 205) with the Control Energy Level (CEL).

If the energy usage is equal to or above the Control Energy Level (CEL), action Disable Load 207 is taken. This action sends a command to the Air Conditioning Controller (ACC) 103 associated with the air conditioner which is at the top of the OFF Priority List, instructing the controller to turn off the air conditioner, and the status of the air conditioner is set to DISABLED. The infra-red controller 107 sends an infra-red signal to the air conditioner 104, turning the air conditioner off. The ACC 103 records that the status of the air conditioner is DISABLED and will ignore usage of the Manual Control for switching that unit on. The air conditioner is placed in the ON Priority List so that it may be re-enabled when energy consumption falls sufficiently to allow this without exceeding the Maximum Energy Limit (MEL). The turning off of the air conditioner 104 will reduce the premises energy usage and ensure that the energy usage does not approach the MEL. Where there are no entries in the OFF Priority List, no action is taken, and the energy consumption may rise above the MEL.

If the check of the value from the Incoming Energy Monitor (IEM) at 204 yields a value below the Control Energy Level (CEL), the action Enable Load 206 is performed. This action causes a command to be sent to the ACC 103 controlling the air conditioner which is at the top of the ON Priority changing the status of the air conditioner to ENABLED. The status of this air conditioner will now be ENABLED and OFF. The ACC 103 will now act upon the usage of the Manual Control associated with that air conditioner to turn the unit on when a user requests that by use of the Manual Control.

As part of the action Maintain ON Priority List, for each air conditioner on the ON Priority List, a comparison is made between the Action Threshold and the temperature reading for the corresponding Temperature Sensor 105. Where the Action Threshold has been breached, a command is sent to the associated ACC 103 whereby the status of the air conditioner is set to ENABLED, and the air conditioner is removed from the ON Priority List. The air conditioner is not placed on the OFF Priority List. This ensures that control is returned to the Manual Control, allowing a user to turn the air conditioner on when desired.

For any air conditioner which has previously been removed from the ON Priority List because an Action Threshold has been breached, and which has been turned on by use of the Manual Control, a comparison is made between the Action Threshold and the temperature reading for the corresponding Temperature Sensor 105. If the temperature as reported by the Temperature Sensor 105 is now within the Action Threshold, the air conditioner will be returned to the OFF Priority List.

The process then repeats from the Incoming Energy Monitor (IEM) check 204.

Thus the EMS operates to keep the energy usage of a premises below a fixed Maximum Energy Limit (MEL) where possible, without unacceptably compromising occupant comfort. This smooths out the peak energy usage of a premises, avoiding high and unpredictable demand charges.

Figure 3:
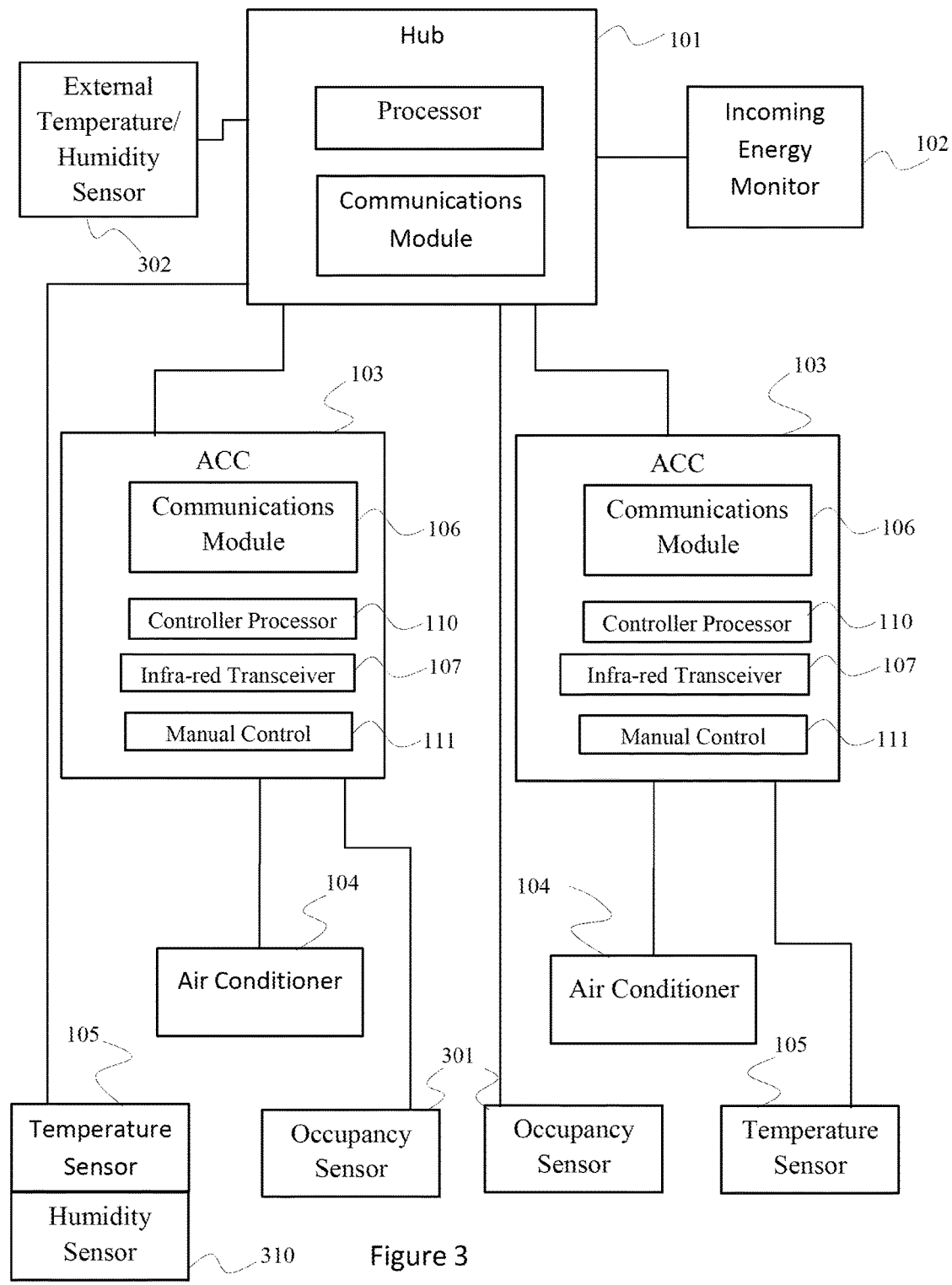
FIG. 3 shows a further version of the invention.

FIG. 3 then shows a further version of the EMS used for controlling air conditioning. Elements which are the same as those in FIG. 1 are numbered identically. A hub 101 monitors Incoming Energy Monitor 102 and controls a number of Air Conditioning Controllers (ACCs) 103, which control air conditioners 104. Control is performed in the same manner as described for the version of FIG. 2. A temperature sensor 105, which is in data communication with the hub 101, is provided in association with each air conditioner 104. A humidity sensor 310 is also provided in association with each temperature sensor 105.

The temperature of the space which is compared with the Action Threshold by the process Control Loads is a "relative temperature". The relative temperature takes humidity into Account in order to determine a consistent comfort level associated with a particular temperature and humidity combination.

Air conditioning is generally only required when a premises is occupied. The requirement for air conditioning in a space may be triggered by the occupancy of any part of the premises, or it may only be required when the particular space is occupied.

An occupancy sensor 301 is provided, preferably in the form of a passive infra-red sensor which detects movement. Other motion sensing technologies, for example microwave transmitters, or combinations of technologies may be used. A single occupancy sensor 301 may be provided for a premises, for example near a main entrance. More preferably, one occupancy sensor 301 is provided in each space to be air conditioned. The occupancy sensors 301 are in data communication with the hub 101, either directly, or via the Air Conditioning Controller (ACC) 103. The hub 101 monitors the output of these occupancy sensors 301. When no occupancy is detected for a period of time, there is no requirement for air conditioning in the space or spaces associated with the occupancy sensor 301. Accordingly, the air conditioners serving those spaces are turned OFF, with status set to ENABLED, and the air conditioners are removed from the OFF Priority List. When the air conditioners are manually turned on, they are returned to the OFF Priority List.

An external temperature sensor 302 is in data communication with the hub 101, and provides the hub 101 processor with the ambient temperature outside the premises. The hub 101 may use this data in the calculation of the Action Thresholds. Sensors to sense other ambient parameters may also be provided, including without limitation sensors to sense external humidity and/or external solar radiation.

A Manual Control 111 is associated with each air conditioner, and operates as described in the description of the version of FIG. 1. This may provide any level of remote control, from simple on/off control to full control of all features including fan speed and any other controllable elements.

Figure 4:
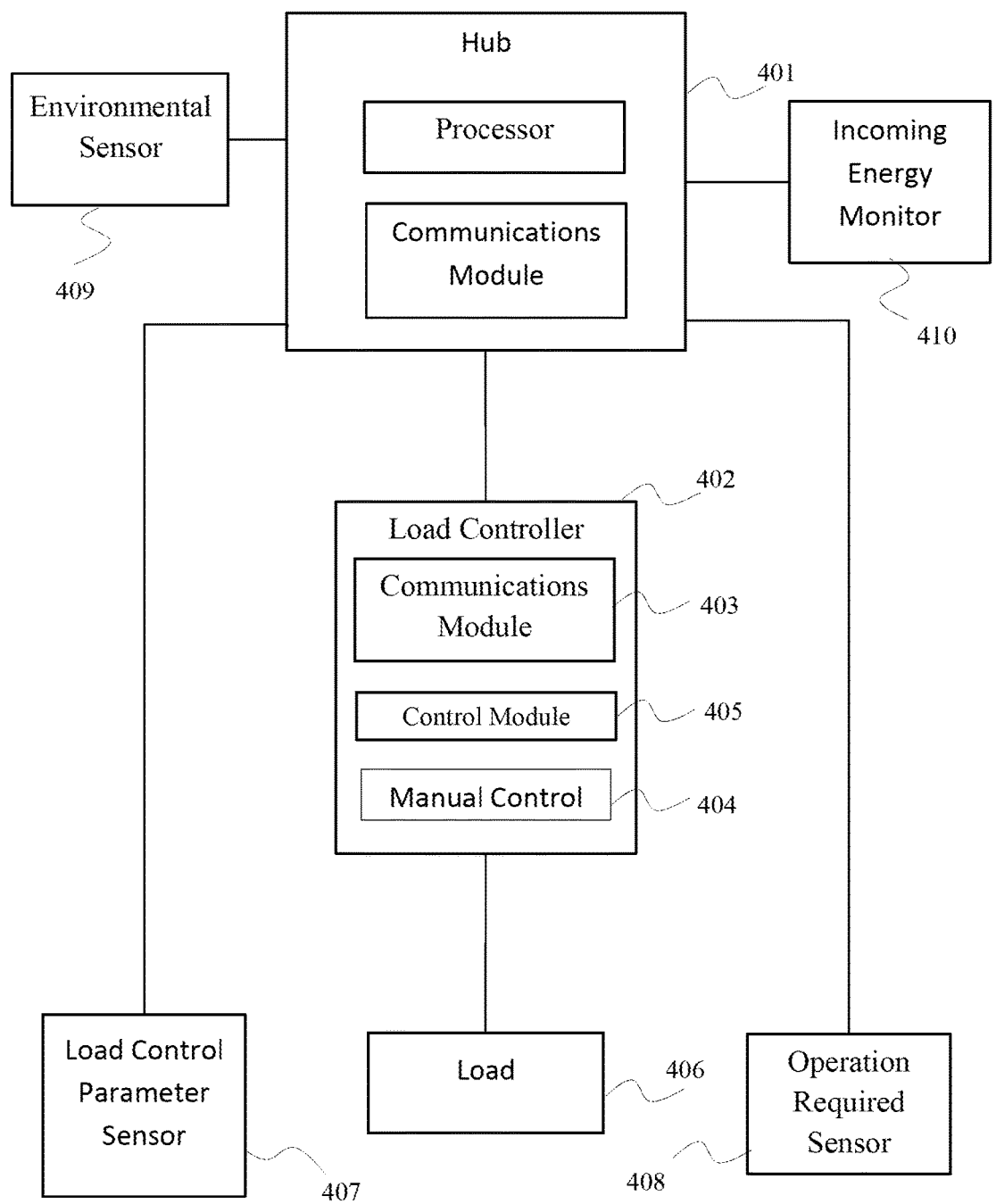
FIG. 4 shows a generalised version of the invention.

The invention has been described with reference to versions for controlling loads in the form of air conditioners. FIG. 4 then shows a block diagram of a generalized system of the invention for controlling any suitable load. A communications and processing hub 401 may be a dedicated processing unit, or may be provided by a general purpose computer programmed to perform the processing and communication function.

The hub 401 is in data communication with an Incoming Energy Monitor (IEM) 410. The IEM 410 monitors the electrical energy delivered to a premises or other installation. The IEM 410 may monitor one, two, or three phase power, and may monitor voltage, current and/or power factor of the incoming electrical supply.

The hub 401 communicates with and controls Load Controller 402. The Load Controller 402 includes a Communications Module 403 for communication with the hub 101, and a Control Module 405 adapted to control one or more Loads 406. The Loads 406 may be any electrical load which is not required to be run continuously. This may include, without limitation, air conditioners, swimming pool pumps, refrigeration equipment and hot water systems.

The Control Module 405 is suitable for controlling the particular Load(s) 406. For a particular type of air conditioner, it may be an infra-red remote control signal sender. For a different type of air conditioner, one which has a control protocol able to be addressed by a data stream, it may be a software process to provide command data and hardware to transmit commands to the air conditioner. For a pool pump, it may be an electronically controlled power switch. For refrigeration equipment or air conditioners with remotely controllable thermostats, the Control Module 405 may be a processor able to generate the required data for communication with such systems and a wired connection to the controlled thermostats. Where a Load 406 is controlled by data such as Internet Protocol (IP) data, the Load Controller 402 may be provided by the processor of the hub 401.

The Control Module 405 may include sufficient processing capability to enable limited actions in the event that communication with the hub 101 is lost. For example, when communication to the hub 101 is lost, the Control Module 405 may be able to turn the associated Load 406 off, while enabling the Manual Control.

The Load Controller 402 may also incorporate a Manual Control 404 for manual control of the particular Load 406.

The Energy Management System (EMS) further includes Load Control Parameter Sensor 407. This is a sensor, provided in association with each Load 406, which senses the value of a Load Control Parameter (the factor which determines whether the Load 406 should be running). For air conditioning, the Load Control Parameter is preferably the temperature, and optionally the humidity, of the air conditioned space. More than one Sensor 407 type may be provided for each Load 406. For example, for an air conditioner, temperature and humidity data may be sensed and provided to the hub 101, allowing Action Thresholds to be adjusted to less extreme values in the presence of high humidity. The Action Threshold may be calculated as a "comfort threshold" taking into account factors other than a single temperature reading. The data from the sensors 407 is provided to the hub 101.

The Load Control Parameter may utilize a virtual sensor rather than a physical sensor. For a pool pump, the usage requirement is usually a certain number of hours of operation per day. Thus the Load Control Parameter is the number of hours left in the day in excess of the hours the pool pump must run and the "sensor" is then provided by a process within the hub 101 which calculates this value.

An "Operation Required Sensor" 408 is also provided. This is a sensor which senses a parameter which determines when the Load 406 should be run. For an air conditioner, and many other loads which are required only if a space is occupied, this may be an occupancy sensor for the air conditioned space. The occupancy sensor may be any suitable type of sensor for indicating the presence of a user including, without limitation, a movement detector, an acoustic detector, or a manual switch to indicate a user's presence. Occupancy may also be inferred by detecting such things as use of a television remote control by an JR detector or use of lighting by a light detector. For other loads, other parameters may be sensed to indicate a requirement that the load should be active.

One or more Environmental Sensors 409 may also be provided. The Environmental Sensor 409 senses the general environment in and/or around the premises. This may include temperature sensors, humidity sensors and solar radiation detectors. The data from these sensors may be used by the hub 101 in determining the appropriate Action Thresholds.

Figure 5:
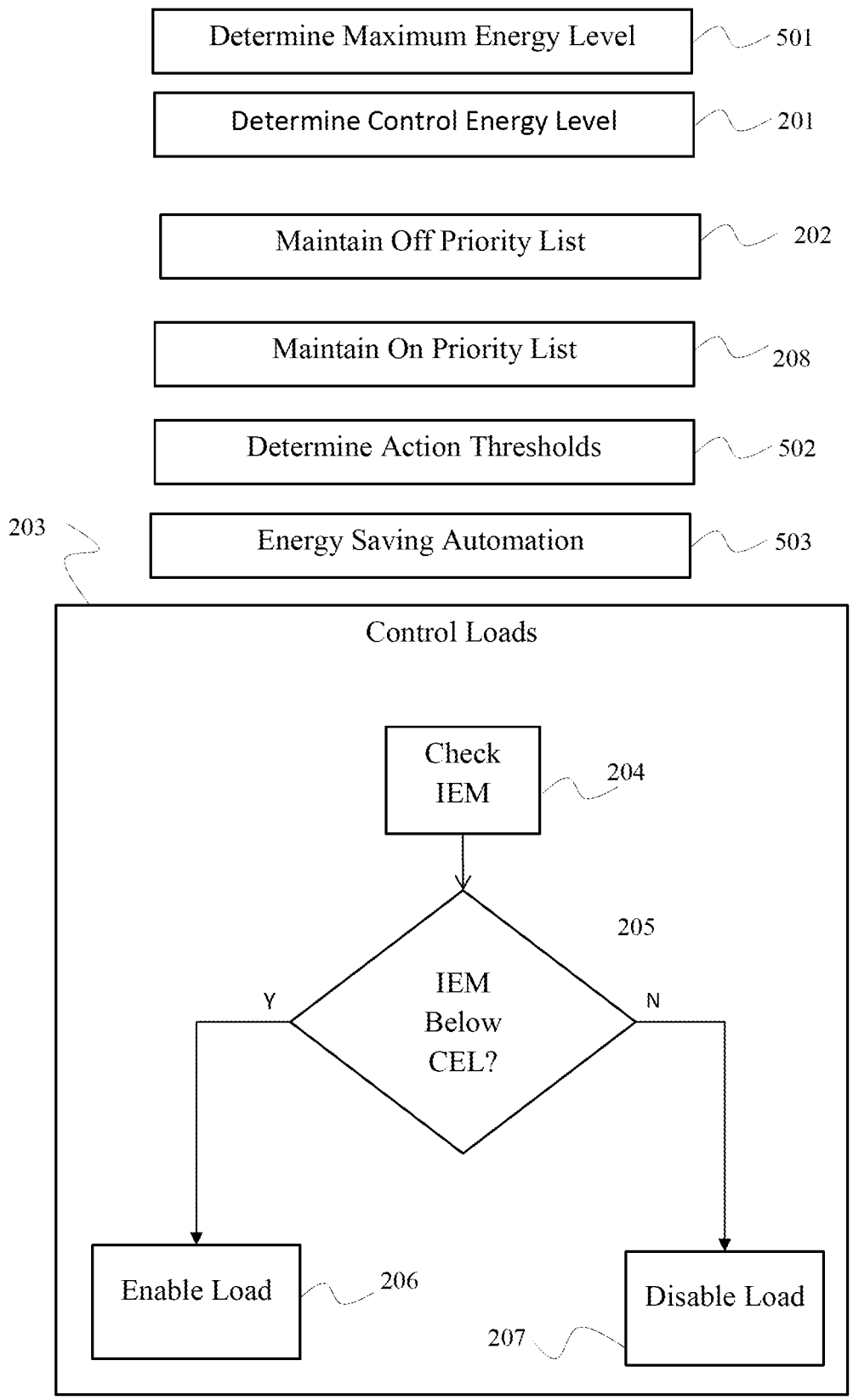
FIG. 5 shows a flowchart of the software of the version of FIG. 4.

The hub 101 processor runs software as illustrated in FIG. 5. The processes illustrated in FIG. 5 having the same reference numbers as those of FIG. 2 behave in the same manner.

The hub 101 processor runs action Determine Maximum Energy Limit (MEL) 501. Setting of the MEL is related to the charging regime applied to the premises by an energy supplier. In the simplest version, this provides a user interface to allow a user to enter a MEL value. This may be a single value, or may be set by time of day, day of week, time of year or any other time or seasonal variation. In a further version, the MEL will be set at a level which keeps the demand charge which will be levied on the premises to an acceptable level. Preferably, avoiding user discomfort is more important than avoiding breach of the MEL. Other factors may be used to determine MEL, such as the known limit of the incoming power supply or the distribution network. One option is to set the MEL to keep the maximum consumption of the premises to a minimum in a given period. This can be done by setting the MEL at the level of the maximum previous consumption for the period. Since the avoidance of user discomfort is more important than remaining below the MEL, this approach allows the MEL to increase as slowly as possible for a period, consistent with avoiding user discomfort.

Historical data concerning ambient conditions, related demand and related maximum energy consumption may be used to determine the Maximum Energy Limit (MEL) 501. Thermal modelling of the spaces to be air-conditioned may also be used to predict demand. For example, where historical data indicates that peak usage for a given billing period will be within a certain band, the MEL may be set just below that band. This allows maximum scope for cost savings, with least effect on user comfort.

In some cases, the demand charge is the whole of the most significant part of the energy bill for a premises for a period. In this case, where a particular maximum energy consumption has been recorded for a billing period, the Maximum Energy Limit (MEL) will be set to at least that value for the remainder of the billing period, since no cost savings will be made by setting a lower MEL.

The hub 101 processor may run action Determine Action Thresholds 502. This action determines and sets the Action Threshold for each controlled Load. Action Thresholds need not be the same for all Loads of the same type controlled by the EMS. Action Thresholds may be set once, periodically by manual command or automatic schedule, or Action Thresholds may be set dynamically on a daily, hourly, or continuous basis. Action thresholds may be set individually for each air conditioner based on the sensor readings from individual air conditioned spaces. The hub 101 is adapted to monitor usage of the Manual Control; the external temperature; if available, the external humidity; the Load Control Parameter Sensor, for example, the temperature of the air conditioned space; and any other data available to determine Action Thresholds which cause minimum inconvenience to users. For example, in an air-conditioned space, the temperature at which the Manual Control is activated to turn an air conditioner on may be monitored over time, with the Action Threshold being set at the average value of this activation temperature, on the assumption that this is the temperature that users begin to find uncomfortable. In a version where the remote control includes the capability to set the air conditioner setpoint, the way in which users vary the setpoint can be used to determine the Action Thresholds. For example, repeated attempts to lower the setpoint are likely to indicate that a user is uncomfortably hot.

The hub 101 processor may analyze and model the thermal behavior of the air conditioned spaces to determine Action Thresholds and position in the Priority Lists. Thermal modeling may include, without limitation, factors such as external temperature, solar radiation, time of day and time of year. For example in a school, a classroom exposed to full sun, in summer, may be determined to heat up very quickly. It might then be placed lower on the OFF Priority List, since the energy saving from turning the cooling off will be short-lived.

The Energy Management System (EMS) may also run a process Energy Saving Automation. This will perform general energy saving control before the Control Energy Level (CEL) is reached. For example, in a school, air conditioning to classrooms may be switched off at 3:30 pm, while remaining ENABLED to allow the air conditioner to be switched on and off manually if required. Staff areas in the same school would not have the air conditioners turned off until 6:00 pm. Spaces occupied by boarding students would never have air conditioners turned off by the Energy Saving Automation process, only being controlled by the Control Loads process. Where controlled Loads are hot water heaters in day school for example, loads may be switched off on weekends.

The process Energy Saving Automation may also perform a time-out function. In a version where air conditioners are controlled, when ENABLED, each air conditioner operates only when manually turned on, and while energy consumption remains below Maximum Energy Limit (MEL), operates until turned off manually. A time-out may be applied whereby, after a certain period has elapsed from the air conditioner being turned on, the Energy Management System (EMS) will turn the air conditioner off, while maintaining the status as ENABLED. Should the user still require air-conditioning, this can be turned on using the Manual Control.

The time-out period may differ by time and by space usage. For example, in a school, classroom air conditioners could be turned off at the end of each lesson period when there will be a change of occupancy. The classroom may not be occupied in the following lesson period, or the new occupants may not have the same air-conditioning requirements.

The invention is not intended to be limited to the preferred versions described above, but rather is intended to be limited only by the claims set out below. Thus, the invention encompasses all different versions that fall literally or equivalently within the scope of these claims.

What is claimed is:

1. An energy management system for controlling operation of one or more electrical loads such that energy usage of the electrical loads remains below a predetermined maximum energy limit, the system being configured to:
    a. determine a control energy level, the control energy level being less than the maximum energy limit;
    b. maintain an OFF priority list of enabled electrical loads suitable for disabling, wherein the OFF priority of each electrical load on the OFF priority list is dependent on the electrical load's distance from an action threshold for the electrical load;
    c. maintain an ON priority list of the disabled electrical loads suitable for enabling, wherein the ON priority of each electrical load on the ON priority list is dependent on the electrical load's proximity to an action threshold for the electrical load;
    d. compare a measure of the energy consumption of the electrical loads to the control energy level, and:
        (1) when the measure of the energy consumption of the electrical loads is less than the control energy level:
            (a) enable the electrical load on the ON priority list having the highest ON priority, and
            (b) add the enabled electrical load to the OFF priority list;
        (2) when the measure of the energy consumption of the electrical loads is greater than the control energy level:
            (a) disable the electrical load on the OFF priority list having the highest OFF priority, and
            (b) add the disabled electrical load to the ON priority list.

2. The energy management system of claim 1 wherein:
    a. each of the electrical loads is a device which is operated intermittently to keep a value of a load control parameter in a defined range, and
    b. the defined range is either above or below the action threshold.

3. The energy management system of claim 2 wherein each of the electrical loads is operated such that the load's energy usage is permitted to exceed the maximum energy limit if necessary to maintain the value of the load control parameter within the defined range.

4. The energy management system of claim 2 wherein each of the electrical loads is operated such that the load control parameter is permitted to deviate from the defined range if necessary to maintain the energy usage of the electrical loads below the maximum energy limit.

5. The energy management system of claim 2 wherein:
   a. the electrical loads are air conditioning devices, and
   b. the load control parameter associated with each electrical load is the temperature of a space in which the electrical load is operating.

6. The energy management system of claim 2 wherein:
   a. the electrical loads are air conditioning devices, and
   b. the load control parameter associated with each electrical load is a comfort level calculated from the temperature and humidity of a space in which the electrical load is operating.

7. The energy management system of claim 2 wherein:
   a. each of the electrical loads is a water heater, and
   b. the load control parameter associated with each electrical load is a water temperature.

8. The energy management system of claim 2 wherein the action threshold is:
   a. determined by the energy management system, and
   b. at least partially dependent upon the actions of a user in manually controlling the operation of the electrical device.

9. The energy management system of claim 2 wherein the action threshold is:
   a. determined by the energy management system, and
   b. at least partially dependent upon the value of environmental parameters other than the load control parameter.

10. The energy management system of claim 1 further including a communications module configured to receive communication of the maximum energy limit from an energy supplier.

11. The energy management system of claim 1 in combination with a load controller:
    a. configured to be controlled by the energy management system, and
    b. including a control module configured to control one or more devices constituting the electrical loads.

12. The load controller of claim 11 wherein:
    a. the controlled devices include one or more air conditioners, and
    b. the control module is an infra-red transmitter configured to send command sequences to the air conditioner.

13. The system of claim 1 wherein the system is further configured to:
    a. enable one of the disabled electrical loads, and
    b. remove the newly-enabled electrical load from the ON priority list, if the electrical load passes the electrical load's action threshold.

14. The energy management system of claim 1 wherein at least some of the electrical loads are heating and/or cooling devices, each such electrical load operating intermittently to keep a value of a load control parameter within a range defined above or below the action threshold for the electrical load.

15. The system of claim 1 wherein each electrical load's action threshold is dependent on one or more of:
    a. a temperature threshold, and
    b. a humidity threshold.

16. An energy management system for controlling operation of one or more electrical loads, the system including:
    A. an incoming energy monitor configured to provide a measure of the energy consumption of the electrical loads;
    B. one or more load controllers, each configured to enable or disable operation of at least one of the electrical loads,
    wherein the system is configured to:
    a. determine a control energy level, the control energy level being less than a maximum energy limit defining an undesirable level of energy consumption by the electrical loads;
    b. maintain an OFF priority list of the electrical loads which are enabled and suitable for disabling, wherein the OFF priority of each electrical load on the OFF priority list is dependent on the electrical load's distance from an action threshold for the electrical load;
    c. maintain an ON priority list of the electrical loads which are disabled and suitable for enabling, wherein the ON priority of each electrical load on the ON priority list is dependent on the electrical load's proximity to an action threshold for the electrical load;
    d. compare a measure of the energy consumption of the electrical loads provided by the incoming energy monitor to the control energy level, and:
       (1) when the measure of the energy consumption of the electrical loads is less than the control energy level:
           (a) enable the electrical load on the ON priority list having the highest ON priority, and
           (b) add the enabled electrical load to the OFF priority list;
       (2) when the measure of the energy consumption of the electrical loads is greater than the control energy level:
           (a) disable the electrical load on the OFF priority list having the highest OFF priority, and
           (b) add the disabled electrical load to the ON priority list.

17. The system of claim 16 wherein the system is further configured to:
    a. enable one of the disabled electrical loads, and
    b. remove the newly-enabled electrical load from the ON priority list, if the disabled electrical load passes the disabled electrical load's action threshold.

18. An energy management system for controlling operation of one or more electrical loads, the system including:
    A. an incoming energy monitor configured to provide a measure of the energy consumption of the electrical loads;
    B. one or more load controllers, each configured to enable or disable operation of at least one of the electrical loads,
    wherein the system is configured to:
    a. determine a control energy level, the control energy level being less than a maximum energy limit defining an undesirable level of energy consumption by the electrical loads;
    b. maintain an OFF priority list of any enabled electrical loads which are suitable for disabling, wherein the OFF priority of each enabled electrical load on the OFF priority list is dependent on the electrical load's distance from an action threshold for the electrical load;
    c. maintain an ON priority list of any disabled electrical loads which are suitable for enabling, wherein the ON priority of each disabled electrical load on the ON priority list is dependent on the electrical load's proximity to an action threshold for the electrical load;
d. when one of the disabled electrical loads on the ON priority list passes the disabled electrical load's action threshold:
(1) enable the disabled electrical load, and
(2) remove the newly-enabled electrical load from the ON priority list.

19. The energy management system of claim 18 wherein the system is further configured to compare the measure of the energy consumption of the electrical loads provided by the incoming energy monitor to the control energy level, and:
a. when the measure of the energy consumption of the electrical loads is less than the control energy level:
(1) enable the electrical load on the ON priority list having the highest ON priority, and
(2) add the enabled electrical load to the OFF priority list;
b. when the measure of the energy consumption of the electrical loads is greater than the control energy level:
(1) disable the electrical load on the OFF priority list having the highest OFF priority, and
(2) add the disabled electrical load to the ON priority list.

20. An energy management system for controlling operation of electrical loads in an installation, each of the loads:
A. having an associated load control parameter, wherein the associated load control parameter has a value which is at least partially controlled by the operation of the load,
B. operating as required to keep the value of the associated load control parameter close to a predetermined setpoint value for the load,
the system including:
I. an incoming energy monitor configured to provide a measure of the energy consumption of the installation,
II. a load controller configured to enable and disable operation of at least one of the electrical loads,
wherein the system is configured to:
a. determine a control energy level, the control energy level being less than a maximum energy limit defining an undesirable level of energy consumption by the electrical loads;
b. compare the measure of the energy consumption of the electrical loads provided by the incoming energy monitor to the control energy level, and when the measure of the energy consumption of the electrical loads is:
(1) less than the control energy level, enable one of the electrical loads which is currently disabled, such that operation of the newly-enabled electrical load would not cause the measure of the energy consumption of the installation to exceed the maximum energy limit, and
(2) greater than the control energy level, disable one of the electrical loads which is currently enabled, such that operation of any remaining enabled electrical loads would not cause the measure of the energy consumption of the installation to exceed the maximum energy limit.

21. The energy management system of claim 20 wherein the control energy level is defined by the maximum energy limit less the electrical load value of the largest one of the electrical loads.

22. The energy management system of claim 20 wherein each of the electrical loads is operated such that the load's load control parameter is permitted to exceed the action threshold if necessary to maintain the energy usage of the installation below the maximum energy limit.

23. The energy management system of claim 20 wherein:
a. at least some of the electrical loads are air conditioning devices, and
b. the load control parameter associated with each such device is the temperature of a space in which the device is operating.

24. The energy management system of claim 20 wherein:
a. at least some of the electrical loads are air conditioning devices, and
b. the load control parameter associated with each device is a comfort level calculated from the temperature and humidity of a space in which the device is operating.

25. The energy management system of claim 20 wherein:
a. at least some of the electrical loads are water heaters, and
b. the load control parameter associated with each such electrical load is a water temperature.

26. The energy management system of claim 20 wherein the system is further configured to:
a. maintain an OFF priority list of the enabled electrical loads which are enabled and suitable for disabling, wherein the OFF priority of each electrical load on the OFF priority list is dependent on the electrical load's distance from an action threshold for the electrical load;
b. maintain an ON priority list of the disabled electrical loads which are disabled and suitable for enabling, wherein the ON priority of each electrical load on the ON priority list is dependent on the electrical load's proximity to an action threshold for the electrical load;
c. compare a measure of the energy consumption of the electrical loads provided by the incoming energy monitor to the control energy level, and:
(1) when the measure of the energy consumption of the electrical loads is less than the control energy level:
(a) enable the electrical load on the ON priority list having the highest ON priority, and
(b) add the enabled electrical load to the OFF priority list;
(2) when the measure of the energy consumption of the electrical loads is greater than the control energy level:
(a) disable the electrical load on the OFF priority list having the highest OFF priority, and
(b) add the disabled electrical load to the ON priority list.

27. The system of claim 26 wherein the system is further configured to enable one of the disabled electrical loads if the load control parameter for the disabled electrical load passes the disabled electrical load's action threshold.

28. The energy management system of claim 26 wherein each of the electrical loads is operated such that the energy usage of the installation is permitted to exceed the maximum energy limit if necessary to prevent the value of the load control parameter passing the action threshold.

29. The energy management system of claim 26 wherein the action threshold is:
a. determined by the energy management system, and
b. at least partially dependent upon the actions of a user in manually controlling the operation of the electrical device.

30. The energy management system of claim 26 wherein the action threshold is:
a. determined by the energy management system, and
b. at least partially dependent upon the value of environmental parameters other than the load control parameter.

31. An energy management system for controlling operation of electrical loads, each of the loads:
  A. having an associated load control parameter, wherein the associated load control parameter has a value which is at least partially controlled by the operation of the load,
  B. operating as required to keep the value of the associated load control parameter close to a predetermined setpoint value for the load,
the system including:
  I. an incoming energy monitor configured to provide a measure of the energy consumption of the electrical loads,
  II. a load controller configured to enable and disable operation of at least one of the electrical loads,
wherein the system is configured to:
  a. determine a control energy level, the control energy level being less than a maximum energy limit defining an undesirable level of energy consumption by the electrical loads;
  b. maintain an OFF priority list of any enabled electrical loads which are suitable for disabling, wherein the OFF priority of each enabled electrical load on the OFF priority list is dependent on the proximity of the current value of the load parameter to the setpoint value for the electrical load;
  c. maintain an ON priority list of any disabled electrical loads which are suitable for enabling, wherein the ON priority of each disabled electrical load on the ON priority list is dependent on the proximity of the current value of the load parameter to an action threshold for the electrical load;
  d. when the load control parameter of one of the disabled electrical loads on the ON priority list passes the disabled electrical load's action threshold:
    (1) enable the disabled electrical load, and
    (2) remove the newly-enabled electrical load from the ON priority list.

32. The energy management system of claim 31 wherein the system is further configured to compare the measure of the energy consumption of the electrical loads provided by the incoming energy monitor to the control energy level, and:
  a. when the measure of the energy consumption of the electrical loads is less than the control energy level:
    (1) enable the electrical load on the ON priority list having the highest ON priority, and
    (2) add the enabled electrical load to the OFF priority list;
  b. when the measure of the energy consumption of the electrical loads is greater than the control energy level:
    (1) disable the electrical load on the OFF priority list having the highest OFF priority, and
    (2) add the disabled electrical load to the ON priority list.

* * * * *